«3,639,350
Patented Feb. 1, 1972»

3,639,350
ESTERIFICATION OF TEREPHTHALIC ACID WITH AN ALKYLENE GLYCOL IN THE PRESENCE OF GUANIDINE OR AN ALKYL GUANIDINE
Stanley D. Lazarus, Petersburg, and Ian C. Twilley, Chester, Va., assignors to Allied Chemical Corporation, New York, N.Y.
No Drawing. Continuation-in-part of application Ser. No. 755,451, Aug. 26, 1968. This application Apr. 15, 1970, Ser. No. 28,938
Int. Cl. C07c *67/00;* C08g *17/013*
U.S. Cl. 260—75 R         16 Claims

ABSTRACT OF THE DISCLOSURE

A process for the direct esterification of terephthalic acid with an alkylene glycol which comprises esterifying terephthalic acid with an alkylene glycol containing 2 to about 10 carbon atoms per molecule under direct esterification conditions in the presence of an amount of guanidine or an alkyl guanidine sufficient to suppress the formation of aliphatic ether groups.

This application is a continuation-in-part of copending application Ser. No. 755,451, filed Aug. 26, 1968, now abandoned for "Esterification of Terephthalic Acid with an Alkylene Glycol in the Presence of Guanidine or an Alkyl Guanidine."

BACKGROUND OF THE INVENTION

This invention relates to a process for the preparation of linear, high molecular weight polyesters having improved properties and more specifically to a process for preparing, by direct esterification and subsequent polymerization, high-molecular weight polyalkylene terephthalates and copolymers thereof using guanidine or an alkyl guanidine as a suppressant in the esterification reaction to suppress the formation of undesirable aliphatic ether groups.

While there are a number of known processes for the direct esterification of terephthalic acid and its subsequent polymerization to polyalkylene terephthalate, there is still a need for a process capable of producing high melting polyesters while at the same time minimizing undesirable concurrent reactions such as the formation of aliphatic ether groups which causes the resulting polymer to be subject to thermal degradation. The problem of ether formation and thermal degradation of the resin is particularly important when the polyesters are to be used as fibers for industrial applications such as, for example, tire yarn.

Reaction conditions usually used in direct esterification reactions such as high alkylene glycol to terephthalic acid ratios and high temperatures also favor side reactions which produce undesirable effects on the polymer including those due to the formation of aliphatic ether groups. These aliphatic ether groups, even though present in small amounts, are undesirable since they become a part of the final polymer chain thereby causing shaped structures produced therefrom to exhibit poor thermal stability, poor ultraviolet light stability, poor hydrolytic stability, poor hot-wet (wash and wear) properties, and accelerated dye fading. If these aliphatic ether units exceed ten mole percent of the terephthalate radicals, the polymer is generally not suitable for fiber or film production.

SUMMARY OF THE INVENTION

It has been found that improved high-molecular weight, linear polyalkylene terephthalates, for example, polyethylene terephthalate, can be prepared which contain a substantially reduced amount of aliphatic ether groups and which are therefore eminently useful for the preparation of fibers and films suitable for textile and industrial applications. These polymers are obtained by esterifying terephthalic acid with an alkylene glycol in the presence of an amount of guanidine or an alkyl guanidine sufficient to suppress the formation of aliphatic ether groups and subsequently condensing the diglycol terephthalate ester and low polymers thereof produced to polyalkylene terephthalate in the presence of a suitable polycondensation catalyst. In accordance with the present invention, linear high-molecular weight fiber and film forming polyester and copolyester are prepared which comprise reacting an aromatic dicarboxylic acid with a polyol containing 2 to about 10 carbon atoms per molecule under direct esterification conditions in the presence of an aliphatic ether suppressant selected from the group consisting of guanidine, substituted alkyl guanidines and the carbonic acid addition salt of guanidine in a concentration sufficient to suppress said aliphatic ethers in said polyester and copolyester. The diglycol terephthalate ester and low polymers thereof produced can then be condensed to polyalkylene terephthalate in the presence of a suitable polycondensation catalyst. The ortho- or meta-isomers of phthalic acid and/or a modified phthalic acid, such as a sulfonated isomer of phthalic acid, may be added to terephthalic acid in small amounts and be esterified along with it to impart particular characteristics to the final polymer depending upon its ultimate use. In addition to the isomers of phthalic acid and modified phthalic acids, it is obvious that other modified compounds such as 2,5 naphthalene dicarboxylic acid, 4,4' dicarboxydiphenyl sulfone, diphenylene phenylene diamine, and/or tricresyl phosphate may also be added to the terephthalic acid in small amounts to change the characteristics of the final polymer depending upon its ultimate use. For example, diphenylene phenylene diamine may be added to improve fatigue resistance if the ultimate product, for example, is to be a tire cord. For convenience in the remainder of the specification and in the claims, when the term terephthalic acid is used alone, it is to be understood that the other isomers of phthalic acid, isomers of modified phthalic acids, and the other modified compounds as described above can be present in the reaction mixture.

The polyalkylene terephthalate polymers may be prepared by esterifying terephthalic acid with one or more alkylene glycols having 2 to about 10 carbon atoms per molecule in the manner described above. Suitable alkylene glycols include, for example, ethylene glycol, propylene glycol, butylene glycol, trimethylene glycol, tetramethylene glycol, hexamethylene glycol, heptamethylene glycol, decamethylene glycol, and mixtures thereof. It is preferred to use the lower molecular weight alkylene glycols which contain 2 to about 4 carbon atoms since they produce highly polymerized esters having high melting points.

In esterifying the terephthalic acid, the alkylene glycol is present during the direct esterification in amounts ranging from about 1 to 3, preferably 1.3 to 1.7, moles of alkylene glycol per mole of terephthalic acid. The direct esterification of the alkylene glycol and the terephthalic acid may start as low as about 200° C. and range up to about 300° C., preferably from about 250° C. to 280° C., either at atmospheric pressure or at pressures ranging up to about 300 p.s.i.g. but more preferably at pressures ranging from about 70 to 250 p.s.i.g. for periods from about ¼ to about 4 hours until the reaction is substantially completed. After the terephthalic acid is esterified with the glycol, the water formed during the reaction, the ether suppressant and excess glycol can be removed by reducing the pressure to atmospheric, thereby leaving a substantially pure esterified prepolymer.

The polymerization or condensation of the diglycol terephthalate ester prepolymer is then carried out at temperatures ranging from about 260° C. to 310° C., preferably about 270° C. to 290° C., under reduced pressure which can be as low as 0.01 mm. of mercury. The condensation may be carried out under these conditions for periods ranging from about 1 to 7, preferably about 2 to 6, hours until a polymerization product of the requisite molecular weight, as determined by viscosity or other convenient physical measurement is obtained. The duration of the condensation will depend obviously upon polymerization conditions, e.g., batch or continuous process, surface generation provisions, temperature and pressure profiles. In a continuous polymerization process, for example, the polymerization mass can be agitated continuously to give maximum exposure to the vacuum which helps to remove the glycol as rapidly as possible. The condensation polymerization is preferably carried out under sub-atmospheric pressures and preferably in an inert atmosphere, e.g., nitrogen, or in the absence of oxygen or oxygen-containing gases.

As indicated, the direct esterification may take place at super atmospheric pressure with temperatures ranging up to about 300° C. for periods ranging up to about 4 hours while the condensation reaction may take place over periods ranging from about 1 to 7 hours. The actual reaction times, however, will obviously vary depending upon the concentration of catalysts, reaction temperatures, reaction pressure, and the molecular weight desired of the final polymer.

In the course of polymerization, other ingredients may be added for obtaining special properties in the polyester product. These ingredients include flame retardants, delustrants, antistatic agents, adhesion promoting agents, heat and light stabilizers, pigments, dyestuff precursors and assistants, fluorescent agents and brighteners, non-reactive and heterogeneous polymers, bacteriostats, and the like.

In preparing the linear, high-molecular weight polyalkylene terephthalates contemplated by this invention, it is desirable to use guanidine or an alkyl guanidine in the direct esterification reaction in amounts ranging from about 0.005 to 1.0, preferably about 0.04 to 0.7, weight percent based on the weight of the terephthalic acid used in the direct esterification reaction. The alkyl guanidine is of the general Formula I or II:

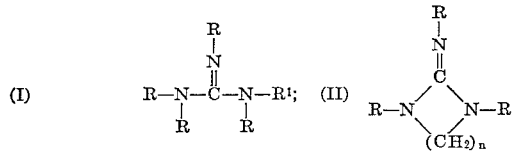

or their weak acid addition salts, or mixtures thereof, wherein $R^1$ is lower alkyl containing up to about 6 carbon atoms, R is hydrogen or lower alkyl containing up to about 6 carbon atoms and $n$ is an integer of about 2 to 10, preferably about 2 to 8. Suitable alkyl guanidines include, for example, 1-methyl guanidine, 1-ethyl guanidine, 1,3- and 1,1-dimethyl guanidine, 1,3- and 1,1-diethyl guanidine, 1,1,3-trimethyl guanidine, 1,1,3,3 - tetramethyl guanidine, pentamethyl guanidine, pentaethyl guanidine, N:N'-ethylideneguanidine, and the like. For increased stability, guanidine and the more unstable alkyl guanidines are often complexed with a weak acid, preferably acetic or carbonic, and used in this form, for example, guanidine (acetate), $HN:C(NH_2)_2 \cdot CH_3COOH$, or guanidine (carbonate), $2[HN:C(NH_2)_2] \cdot H_2CO_3$. These complexed and stabilized forms of the guanidines are sometimes called their acid addition salts. The presence of guanidine or an alkyl guanidine in the direct esterification reaction suppresses the formation of aliphatic ether groups which can become part of the final polymer chain thereby causing shaped structures produced therefrom to exhibit poor physical and chemical properties, e.g., poor thermal stability. The guanidine or alkyl guanidine is added to the terephthalic acid-alkylene glycol reaction mixture prior to esterification. Superior results are obtained when the guanidine or alkyl guanidine is homogenized with the reactant glycol and acid. When less than 0.005 weight percent of guanidine or alkyl guanidine per weight of terephthalic acid initially present is employed, its effect is generally not sufficient to suppress the formation of aliphatic ether groups. On the other hand, when more than 1.0 weight percent of guanidine or alkyl guanidine is employed, undesirable discoloration in the final polymer can result.

The use of guanidine or an alkyl guanidine in the direct esterification as described above produces terephthalate ester prepolymer suitable for condensation or polymerization to a fiber or film-forming polymer. The polyalkylene terephthalate is condensed in the manner described above in the presence of a suitable polycondensation catalyst which can be a compound of antimony such as antimony trioxide or antimony oxalate but preferably an antimony salt of one of the higher fatty acids or a mixture of such acids such as the salt of the complex acid mixture of tall oil. The tall oil acids used in preparing such antimony salts are commercially available and may be characterized as composing (1) rosin acids including abietic, neoabietic, dehydroabietic, levopimaric, palustric, pimaric and isopimaric acids; (2) saturated fatty acids including stearic, palmitic and lauric acids, etc.; (3) unsaturated fatty acids, mainly oleic and linoleic, with a small amount of linolenic; and (4) unsaponifiables, mainly hydrocarbons such as various terpenes, alcohols and sterols. The tall oil acids may be refined or unrefined, however, the preferred tall oil acids are the highly refined or double-fractionated tall oil acid mixtures comprising about 1 percent of the rosin acids, about 96.8 percent of the fatty acids, e.g., about 46 percent linoleic acid, about 48 percent oleic acid and about 2.8 percent saturated fatty acids, and about 2.2 percent of the unsaponifiables. A particularly preferred antimony compound is antimony tris-tallate. These preferred catalysts, e.g., antimony salts of tall oil, may be further characterized as being volatile to the extent of at least 15 percent during the polymerization when exposed, for example, to a vacuum of about 0.3 to 0.6 mm. of Hg at temperatures of about 275 to 280° C. The antimony salt of a tall oil acid can be prepared by heating antimony trioxide, for example, at reflux temperatures with agitation until all of the acid is neutralized, as indicated by the acid number of the final product.

It has been found that although polymerization catalysts such as the antimony compounds named above have little or no effect in promoting the direct esterification reaction between terephthalic acid and ethylene glycol, they likewise have no particular deleterious effect on the esterification reaction and, therefore, may be added with the guanidine or alkyl guanidine to the reaction mixture prior to commencement of the direct esterification reaction.

PREFERRED EMBODIMENTS

The following examples illustrate the practice and principles of this invention and a mode of carrying out the invention.

EXAMPLE 1

A 1 gallon stainless steel autoclave fitted with a double spiral agitator, a condensor, and provided with electrically heated jacket set at 95° C. was charged with 908 grams of fiber grade terephthalic acid, 681 grams of fiber grade ethylene glycol, 0.908 gram of guanidine (carbonate) and 2.27 grams of antimony tris-tallate. The autoclave was purged with nitrogen, sealed and heated at a temperature of 245° C. The agitator was set at 30 r.p.m. A relief valve on the condenser was set at 70 p.s.i.g. When the temperature reached about 240° C., a mixture of water and ethylene glycol distilled over and was collected, weighed and measured for percent water by refractive index. As the reaction approached completion, in about three hours, the temperature of the reactants started to rise and the esterification reaction was completed when the temperature of the reactants indicated about 250° C. The pressure was gradually released from the autoclave during the next 45 minutes and the temperature of the esterified product declined to about 245° C. as the pressure was reduced to atmospheric. Water formed during the esterification reaction, ether suppressant and excess glycol were removed from the esterified product or prepolymer by distillation as the pressure was reduced to atmospheric. The prepolymer product was allowed to cool to room temperature under nitrogen and was removed from the autoclave as a plug. Four runs were made which comprised two runs with guanidine (carbonate) and two control runs.

The prepolymers prepared above were analyzed for diethylene glycol content and the results are contained in Table I below.

TABLE I

| Run number | Ether suppressant | Prepolymer diethylene glycol contents, mole percent |
|---|---|---|
| 1 | Guanidine (carbonate) plus antimony tris-tallate. | 4.25 |
| 2 | do | 5.00 |
| 3 | Control (no ether suppressant) plus antimony tris-tallate. | 7.2 |
| 4 | do | 9.45 |

The results in the above Table I show that guanidine (carbonate) is an effective suppressant for the formation of aliphatic ether groups in producing the prepolymer.

The prepolymers prepared above were ground and charged into the above 1 gallon stainless steel autoclave for polymerization. A vacuum pump was then attached to the condenser and the temperature was increased to about 280° C. A vacuum was applied when the reactant temperature reached 275° C. A vacuum of 0.2 mm. Hg was attained in about 30 minutes and was maintained during the polymerization. When a steady vacuum was attained, the speed of the agitator was reduced to 15 r.p.m. Polymerization was continued for 5 hours and was accompanied by an increase of power required to maintain constant agitator speed. Purified nitrogen was then admitted to the autoclave and a pressure of 20 p.s.i.g. was maintained while the polymer was extruded through a valve at the bottom of the autoclave into a quench trough filled with water. The extruded polymer was then fed onto a takeup reel. The polymer strand was subsequently pelletized using a Wiley Mill.

The polymers prepared above were analyzed for diethylene glycol content and the results are contained in Table II below.

TABLE II

| Run number | Ether suppressant | Polymer diethylene glycol content, mole percent |
|---|---|---|
| 1 | Guanidine (carbonate) plus antimony tris-tallate. | 5.30 |
| 2 | do | 6.7 |
| 3 | Control (no ether suppressant) plus antimony tris-tallate. | 10.6 |
| 4 | do | 12.7 |

The results in the above Table II show that guanidine (carbonate) is an effective suppressant for the formation of aliphatic ether groups in producing the polymer.

A comparison of the data contained in Tables I and II above also indicates that the presence of guanidine (carbonate) in the polymerization reaction is also effective in suppressing aliphatic ether formation during the polymerization of the prepolymer. These data are combined in Table III below.

TABLE III

| | | Diethylene glycol content, mole percent | | |
|---|---|---|---|---|
| Run number | Ether suppressant | Prepolymer | Polymer | Difference [1] |
| 1 | Guanidine (carbonate) plus antimony tris-tallate | 4.25 | 5.30 | 1.05 |
| 2 | do | 5.00 | 6.7 | 1.7 |
| 3 | Control (no ether suppressant) plus antimony tris-tallate. | 7.2 | 10.6 | 3.4 |
| 4 | do | 9.45 | 12.7 | 3.25 |

[1] In diethylene glycol content-prepolymer: polymer, mole percent.

EXAMPLE 2

The 1 gallon stainless steel autoclave used in Example 1 is charged with 908 grams of fiber grade terephthalic acid, 681 grams of fiber grade ethylene glycol, 0.908 gram of 1-methyl guanidine and 2.27 grams of antimony tris-tallate. The esterification and polymerization reactions are conducted in the same manner as described in Example 1. A comparable suppression of the aliphatic ether groups in both the prepolymer and polymer is obtained as in Example 1.

EXAMPLE 3

The 1 gallon stainless steel autoclave used in Example 1 is charged with 908 grams of fiber grade terephthalic acid, 681 grams of fiber grade ethylene glycol, 0.908 grams of 1-ethyl guanidine and 2.27 grams of antimony tris-tallate. The esterification and polymerization reactions are conducted in the same manner as described in Example 1. A comparable suppression of the aliphatic ether groups in both the prepolymer and polymer is obtained as in Example 1.

EXAMPLE 4

The 1 gallon stainless steel autoclave used in Example 1 is charged with 908 grams of fiber grade terephthalic acid, 681 grams of fiber grade ethylene glycol, 0.908 gram of N:N'-ethylideneguanidine as represented by the formula:

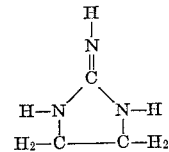

and 2.27 grams of antimony tris-tallate. The esterification and polymerization reactions are conducted in the same manner as described in Example 1. A comparable suppression of the aliphatic ether groups in both the prepolymer and polymer is obtained as in Example 1.

EXAMPLE 5

A 1 gallon stainless steel autoclave fitted with a double spiral agitator, a condenser and an electrically heated jacket set at 95° C. was charged with 830 grams (5 moles) of terephthalic acid and 465 grams (7.5 moles) of ethylene glycol and 2.42 grams (0.04 mole) of guanidine. The autoclave was purged with nitrogen, sealed and heated at a temperature of 260° C. The agitator was set at 30 r.p.m. and the pressure was maintained at 75 p.s.i.g. by venting as required. After 60 minutes at 75 p.s.i.g. the pressure was reduced to atmospheric over a 45-minute time period. A sample of this product has an intrinsic viscosity of 0.10 in 60:40 weight mixture of phenol:tetrachloroethane. By saponification and gas chromatography, it was established that the polymer contained 3.66 mol percent of diethylene glycol. Further polymerization was effected by adding 0.237 gram of antimony trioxide to the autoclave, increasing the temperature to 280° C. and reacting under a pressure of 0.2 mm. Hg of 3 hours while agitating at 15 r.p.m. The polymer was extruded from the bottom of the autoclave by applying nitrogen gas pressure, quenched in a water trough and pelletized in a Wiley mill. After drying the polymer under vacuum, it had an intrinsic viscosity of 0.73 and a diethylene glycol content of 3.98 mol percent. The polymer was spun on a one-inch extruder at the rate of 1100 f.p.m. and drawn over heated rolls at ratio of 5.8 to 1 into a 144 denier 19 filament yarn having a tenacity of 7.5 g.p.d. and an ultimate elongation of 13.2%.

EXAMPLE 6

The same procedure was followed as in Example 5 except that guanidine was omitted from the autoclave charge. Results are shown in the following table.

EXAMPLE 7

The same procedure was followed as in Example 5 except that 4.84 grams of guanidine were charged to the autoclave. Results are shown in the following table.

EXAMPLE 8

The same procedure was followed as in Example 5 except that 1.21 grams of guanidine were charged to the autoclave. Results are shown in the following table.

TABLE IV.—ANALYSES OF POLYMERS PREPARED IN EXAMPLES 5-8

| Example No. | Weight percent guanidine [1] | Mol percent diethylene glycol | | Intrinsic viscosity | |
|---|---|---|---|---|---|
| | | After esterification | After polymerization | After esterification | After polymerization |
| 5 | 0.29 | 3.66 | 3.98 | 0.10 | 0.73 |
| 6 | [2] | 5.11 | 5.95 | 0.11 | 0.72 |
| 7 | 0.58 | 3.00 | 3.77 | 0.09 | 0.66 |
| 8 | 0.15 | 3.96 | 4.47 | 0.11 | 0.74 |

[1] On terephthalic acid.
[2] None (control).

We claim:
1. A process for the preparation of a linear high-molecular weight, fiber and film forming polyester which comprises reacting an aromatic dicarboxylic acid with an alkylene glycol containing 2 to about 10 carbon atoms per molecule under direct esterification conditions in the presence of an effective amount of an aliphatic ether suppressant selected from the group consisting of guanidine, alkyl guanidines selected from the group consisting of compounds having the general formulas:

(I)
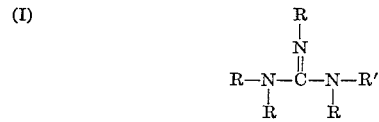

and (II)
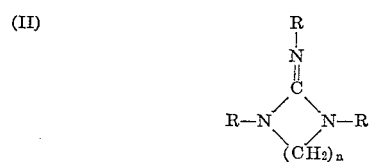

wherein

R is selected from the group consisting of hydrogen and lower alkyl containing up to about 6 carbon atoms,
R₂ is a lower alkyl containing up to about 6 carbon atoms, and
n is an integer of about 2 to 10, and the acetic and carbonic acid addition salts of said guanidine and alkyl guanidine compounds, and thereafter carrying out the condensation of the resulting esterified pre-polymer in the presence of a catalytic amount of a polycondensation catalyst.

2. The process of claim 1 wherein the aliphatic ether suppressant is guanidine.

3. The process of claim 1 wherein the alkyl guanidine is selected from the group consisting of 1-methyl guanidine, 1-ethyl guanidine, and N,N'-ethylideneguanidine.

4. The process of claim 1 wherein the aliphatic ether suppressant is the carbonic acid addition salt of guanidine.

5. The process of claim 1 wherein the direct esterification reaction is carried out at temperatures ranging from about 200 to about 300° C. and at pressures ranging from about atmospheric to about 300 p.s.i.g.

6. The process of claim 1 wherein the aromatic dicarboxylic acid is terephthalic acid, the alkylene glycol is ethylene glycol and the aliphatic ether suppressant is present in the amount of about 0.005 to about 1.0 weight percent based upon the weight of the aromatic dicarboxylic acid.

7. The process of claim 1 wherein the alkylene glycol is reacted with the aromatic dicarboxylic acid in an amount ranging from about 1 to about 3 moles of polyol per mole of acid.

8. The process of claim 1 wherein the direct esterification reaction is carried out at temperatures ranging from about 250° C. to about 280° C. and at pressures ranging from about 70 p.s.i.g. to about 250 p.s.i.g.

9. The process of claim 1 wherein the polycondensation catalyst is an antimony salt of tall oil acid.

10. A process for the preparation of a linear high-molecular weight, fiber and film forming polyester which comprises reacting an aromatic dicarboxylic acid with an alkylene glycol containing 2 to about 10 carbon atoms per molecule under direct esterification conditions in the presence of an effective amount of an aliphatic ether suppressant selected from the group consisting of compounds having the general formulas:

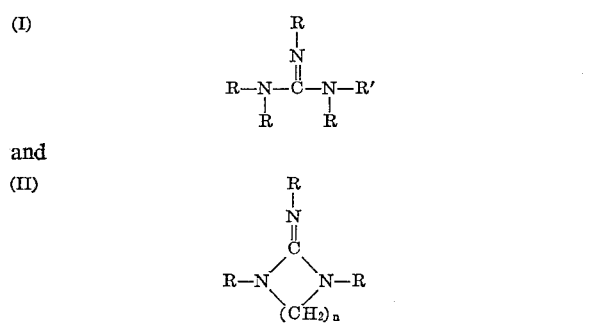

and their acid addition salts with an acid selected from the group consisting of acetic and carbonic, wherein R is selected from the group consisting of hydrogen and lower alkyl containing up to about 6 carbon atoms,
R' is a lower alkyl containing up to about 6 carbon atoms, and
n is an integer of about 2 to 10, and thereafter carrying out the condensation of the resulting esterified pre-polymer in the presence of a catalytic amount of a polycondensation catalyst.

11. The precess of claim 10 wherein the alkyl guanidine is selected from the group consisting of 1-methyl guanidine, 1-ethyl guanidine, and N,N'-ethylideneguanidine.

12. The process of claim 10 wherein the direct esterification reaction is carried out at temperatures ranging from about 200 to about 300° C. and at pressures ranging from about atmospheric to about 300 p.s.i.g.

13. The process of claim 10 wherein the aromatic dicarboxylic acid is terephthalic acid, the alkylene glycol is ethylene glycol and the aliphatic ether suppressant is present in the amount of about 0.005 to about 1.0 weight percent based upon the weight of the aromatic dicarboxylic acid.

14. The process of claim 10 wherein the alkylene glycol is reacted with the aromatic dicarboxylic acid in an amount ranging from about 1 to about 3 moles of alkylene glycol per mole of acid.

15. The process of claim 10 wherein the direct esterification reaction is carried out at temperatures ranging from about 250° C. to about 280° C. and at pressures ranging from about 70 p.s.i.g. to about 250 p.s.i.g.

16. The process of claim 10 wherein the polycondensation catalyst is an antimony salt of tall oil acid.

References Cited

UNITED STATES PATENTS

| | | | |
|---|---|---|---|
| 2,970,986 | 2/1961 | Woodward | 260—75 |
| 3,254,054 | 5/1966 | Boerma | 260—75 |

WILLIAM H. SHORT, Primary Examiner

L. P. QUAST, Assistant Examiner

U.S. Cl. X.R.

260—475 P